USO10495227B2

(12) United States Patent
Dop et al.

(10) Patent No.: US 10,495,227 B2
(45) Date of Patent: Dec. 3, 2019

(54) DYNAMIC SEAL

(71) Applicant: AKTIEBOLAGET SKF, Göteborg (SE)

(72) Inventors: Gerrit-Jan Dop, Alphen aan den Rijn (NL); Jos Holsnijders, Leerdam (NL)

(73) Assignee: AKTIEBOLAGET SKF, Gothenburg (SE)

( * ) Notice: Subject to any disclaimer, the term of this patent is extended or adjusted under 35 U.S.C. 154(b) by 302 days.

(21) Appl. No.: 15/119,076

(22) PCT Filed: Feb. 14, 2014

(86) PCT No.: PCT/EP2014/052891
§ 371 (c)(1),
(2) Date: Aug. 15, 2016

(87) PCT Pub. No.: WO2015/120899
PCT Pub. Date: Aug. 20, 2015

(65) Prior Publication Data
US 2017/0045140 A1    Feb. 16, 2017

(51) Int. Cl.
*F16J 15/32*     (2016.01)
*F16J 15/3224*   (2016.01)
*F16J 15/3284*   (2016.01)
*F16J 15/3256*   (2016.01)

(52) U.S. Cl.
CPC ....... *F16J 15/3224* (2013.01); *F16J 15/3284* (2013.01); *F16J 15/3256* (2013.01)

(58) Field of Classification Search
CPC .... F16J 15/3212; F16J 15/3232; F16J 15/322; F16J 15/3224; F16J 15/3268; F16J 15/3456; F16J 15/348
See application file for complete search history.

(56) References Cited

U.S. PATENT DOCUMENTS 2,192,305 A * 3/1940 Gilman ................ F16J 15/3456
                                            277/367
2,705,164 A * 3/1955 Dasse ..................... F16J 15/348
                                            188/218 A
3,218,087 A * 11/1965 Hallesy ................ F16J 15/3208
                                            277/532

(Continued)

FOREIGN PATENT DOCUMENTS

DE        2431110 A1      1/1976
GB        2417993 A       3/2006

*Primary Examiner* — Nicholas L Foster
*Assistant Examiner* — L. Susmitha Koneru

(57) ABSTRACT

The present invention provides a dynamic seal for enclosing a radial gap between coaxial, relatively rotatable inner and outer members. The dynamic seal includes an inner seal part, mountable to the inner member; an outer seal part, mountable to the outer member; and a counterface part radially suspended between the inner and outer seal parts and coaxial therewith. Each of the inner and outer seal parts provides a set of first and second sealing elements, which bear against oppositely oriented axial surfaces of the counterface part. The counterface part is thus axially retained in both directions by the inner seal part at a radially inner contact location, and is axially retained in both directions by the outer seal part at a radially outer contact location.

12 Claims, 4 Drawing Sheets

(56) References Cited

U.S. PATENT DOCUMENTS

| | | | | |
|---|---|---|---|---|
| 3,442,516 | A | * | 5/1969 | Voitik ................. F16J 15/3456 277/365 |
| 3,906,746 | A | * | 9/1975 | Haines ................. F16C 21/005 277/371 |
| 4,159,828 | A | * | 7/1979 | Ostling ................. F16C 33/76 277/500 |
| 4,348,031 | A | * | 9/1982 | Johnston ............... F16J 15/164 277/363 |
| 5,626,520 | A | * | 5/1997 | Mazziotti ............ F16C 33/7809 277/566 |
| 7,959,159 | B2 | * | 6/2011 | Hocker ............... F02M 59/442 277/559 |
| 9,611,712 | B2 | * | 4/2017 | Kalinec ................ E21B 33/035 |
| 9,638,330 | B2 | * | 5/2017 | Itou ...................... F04B 53/14 |
| 9,670,923 | B2 | * | 6/2017 | Weaver ................ F04B 53/143 |
| 9,714,504 | B2 | * | 7/2017 | Bird ........................ E03C 1/22 |
| 2013/0043660 | A1 | * | 2/2013 | Daub .................. F16J 15/3212 277/500 |

* cited by examiner

DYNAMIC SEAL

CROSS REFERENCE TO RELATED APPLICATIONS

This is a National Stage Application claiming the benefit of International Application Number PCT/EP2014/052891 filed on 14 Feb. 2014.

FIELD OF THE INVENTION

The invention relates to a seal for enclosing a radial gap between relatively rotatable coaxial components. More particularly, the invention is directed to such a seal which is able to compensate for positional variations while maintaining sealing contact.

BACKGROUND TO THE INVENTION

A common application for a radial seal is to seal the radial gap between a shaft and e.g. a bearing housing. The seal typically comprises an annular casing that is mounted in a bore of the bearing housing, and further comprises an elastomeric seal lip that is bonded to the metal casing. The seal lip bears against the shaft and makes sliding contact with a shaft counterface during rotation. Especially at high speeds, the shaft may rotate with a slight eccentricity, known as dynamic run-out, which in effect changes the radial gap between the counterface and the housing. To ensure that the seal lip remains in contact with the counterface, the seal is generally mounted with a very small clearance and the lip is spring-loaded. The radial load on the seal lip generates additional friction and the seal typically experiences uneven wear around the lip circumference.

One solution for removing the radial load on a seal is to execute the seal with radially overlapping parts and axially oriented seal contact surfaces. An example of a seal of this kind is disclosed in U.S. Pat. No. 4,348,031. The document describes a rotary fluid seal having a sealing ring arranged between axially opposed counterfaces of relatively rotatable members. The sealing ring has a pair of divergent seal lips which bear against the counterfaces, but are able to float freely between the relatively rotatable members. Upon relative rotation of the members, the sealing ring is frictionally driven into rotation by one or other of the members.

There is still room for improvement.

BRIEF SUMMARY OF THE INVENTION

The present invention resides in a dynamic seal for enclosing a radial gap between coaxial, relatively rotatable inner and outer members. The dynamic seal comprises an inner seal part, mountable to the inner member; an outer seal part, mountable to the outer member; and a counterface part radially suspended between the inner and outer seal parts and coaxial therewith. Each of the inner and outer seal parts comprises a set of first and second sealing elements which bear against oppositely oriented axial surfaces of the counterface part. The counterface part is thus axially retained in both directions by the inner seal part at a radially inner contact location, and is axially retained in both directions by the outer seal part at a radially outer contact location.

The counterface part is not connected to either of the inner seal part or the outer seal part, and is thus a floating part, free of radial load. Relative radial movements between the inner and outer seal parts can therefore be accommodated in a manner that does not increase friction and wear.

Further, the axial retention of the counterface part by each of the inner and outer seal parts means that the seal has two potential dynamic contact locations. Let us assume that the outer member and the outer seal part are rotational during dynamic sealing conditions. If the friction at the radially outer contact location is greater than the friction at the radially inner contact location, the counterface part will rotate with the outer seal part and the sealing elements of the inner seal part will be in sliding contact with the counterface part. If the friction at the radially inner contact location becomes greater than at the radially outer contact location, then the counterface part will "stick" to the inner seal part and the rotational sealing elements of the outer seal part will be in sliding contact with the counterface part.

A dynamic seal according to the invention is thus able to adopt a second dynamic contact location before the friction at a first dynamic contact location becomes excessively high. Wear is thus prevented, which prolongs the life of the seal.

In a first embodiment, at least one of the first and second sealing elements of the inner and outer seal parts are axially enclosed between oppositely oriented axial surfaces of the counterface part. In one example, the counterface part comprises a ring with an outer U-shaped section at the radially outer circumference and an inner U-shaped section at the radially inner circumference. The outer seal part then comprises a flange that extends into the outer U-shaped section of the counterface part. The first and second sealing elements may be executed as lips that bear against the inner axial surfaces of the outer U-shaped section. Likewise, the inner seal part comprises a flange that extends into the inner U-section of the counterface part and which has first and second seal lips that bear against the inner axial surfaces of the inner U-section.

In a second embodiment, the counterface part is axially enclosed by the first and second sealing elements of at least one of the inner and outer seal parts. In a preferred example, the counterface part is formed by a flat ring. A radially outer edge of the flat ring extends into a cavity of the outer seal part, which is enclosed by the first and second sealing elements of the outer seal part. Likewise, a radially inner edge of the flat ring extends into a cavity of the inner seal part, which is enclosed by the first and second sealing elements of the inner seal part. Advantageously, each cavity is filled with a lubricant such as grease, to lubricate whichever set of sealing elements are in sliding contact with the axial surfaces of the flat ring.

The counterface part may be made of a metal, ceramic or polymer material. The axial surfaces of the counterface part which are in contact with the sealing elements may advantageously be provided with a low-friction coating, to minimise seal wear. In some examples, the counterface part comprises a breathable material that prevents moisture from entering the sealed environment, but permits moisture to escape.

The sealing elements of the inner and outer seal parts are preferably made from an elastomeric material such as Acryl-Nitrile-Butadiene Rubber, Ethylene Propylene Rubber, Fluorocarbon Rubber or Silicone Rubber. Suitably, each sealing element comprises a lip section having an axially oriented surface that is at least partly in contact with the counterface part. The sealing element may further comprise an arm section that is bonded to e.g. a casing element. In some examples, the lip section is made of a first elastomeric material and the arm section is made of a second elastomeric material, which has a lower elastic modulus that the first elastomeric material. The arm section may thus provide the sealing element with flexibility, while the lip section has better wear resistance.

In a further development of the second embodiment, the dynamic seal is adapted to permit an axial displacement of the counterface part relative to the inner and outer members, in a manner which maintains effective sealing between the counterface part and each set of first and second sealing elements.

Suitably, each of the first and second sealing elements of the inner seal part comprises an inner lip section that is contact with an axial surface of the counterface part and further comprises an arm section with a flexure that resiliently urges the lip section against the corresponding axial surface. Likewise, each of the first and second sealing elements of the outer seal part comprises an outer lip section that is contact with an axial surface of the counterface part and further comprises an arm section with a flexure that resiliently urges the lip section against the corresponding axial surface. The flexure in each arm section is further adapted to serve as a hinge point about which each arm section rotates in response to an axial displacement of the counterface part relative to the inner and outer members. As a result, the lip section of each sealing element of the inner and outer seal parts remains parallel to the counterface part, to maintain an effective sealing contact.

The axial deflection may occur as the result of a pressure build up within e.g. a sealed bearing. A seal according to the further development of the invention may thus be used to compensate for pressure differentials.

The seal may be adapted to accommodate an axial deflection of 0.1-0.8 mm, depending on the expected pressure differential. Suitably, when an axial deflection towards one axial side of the seal is to be accommodated, the sealing elements of the inner and outer seal at that axial side have an appropriate stiffness that permits the deflection.

Preferably, a seal according to the invention has radial and axial symmetry.

Advantageously, the lip section of each sealing element may comprise a plurality of micro-lips formed by protrusions that extend from an axial surface of the lip section. The micro-lips have a small contact area in comparison with the axial surface as whole, to minimize contact friction.

In one example of a dynamic seal according to the further development of the invention, the lip section of at least one sealing element comprises at least one first micro-lip that is in contact with the counterface part when this part is in a central (axially undeflected) position. The lip section further comprises at least one second micro-lip that is arranged with an axial gap to the counterface part. The axial gap is less than or equal to a maximum axial deflection that the seal is designed to accommodate. Thus, when the aforementioned axial deflection takes place, the at least one second micro-lip comes into contact with the counterface part, to enhance the sealing effect.

A seal according to the invention has further advantages, which will become apparent from the following detailed description and accompanying figures.

BRIEF DESCRIPTION OF THE SEVERAL VIEWS OF THE DRAWING

In the following, the invention is described with reference to the accompanying drawings, in which.

DETAILED DESCRIPTION OF THE INVENTION

Radial seals are employed to enclose a radial gap between coaxial, relatively rotatable components, such as a bearing housing and a shaft. The seal serves to retain lubricant within the bearing and to exclude external contaminants, such as moisture and dirt. The seal typically has one or more seal lips which, in use of the seal, are in sliding contact with a counterface. To ensure effective sealing, the lip(s) need to remain in contact with the counterface at all times. Preferably, contact is ensured in a manner that minimises friction and wear.

Figure 1:
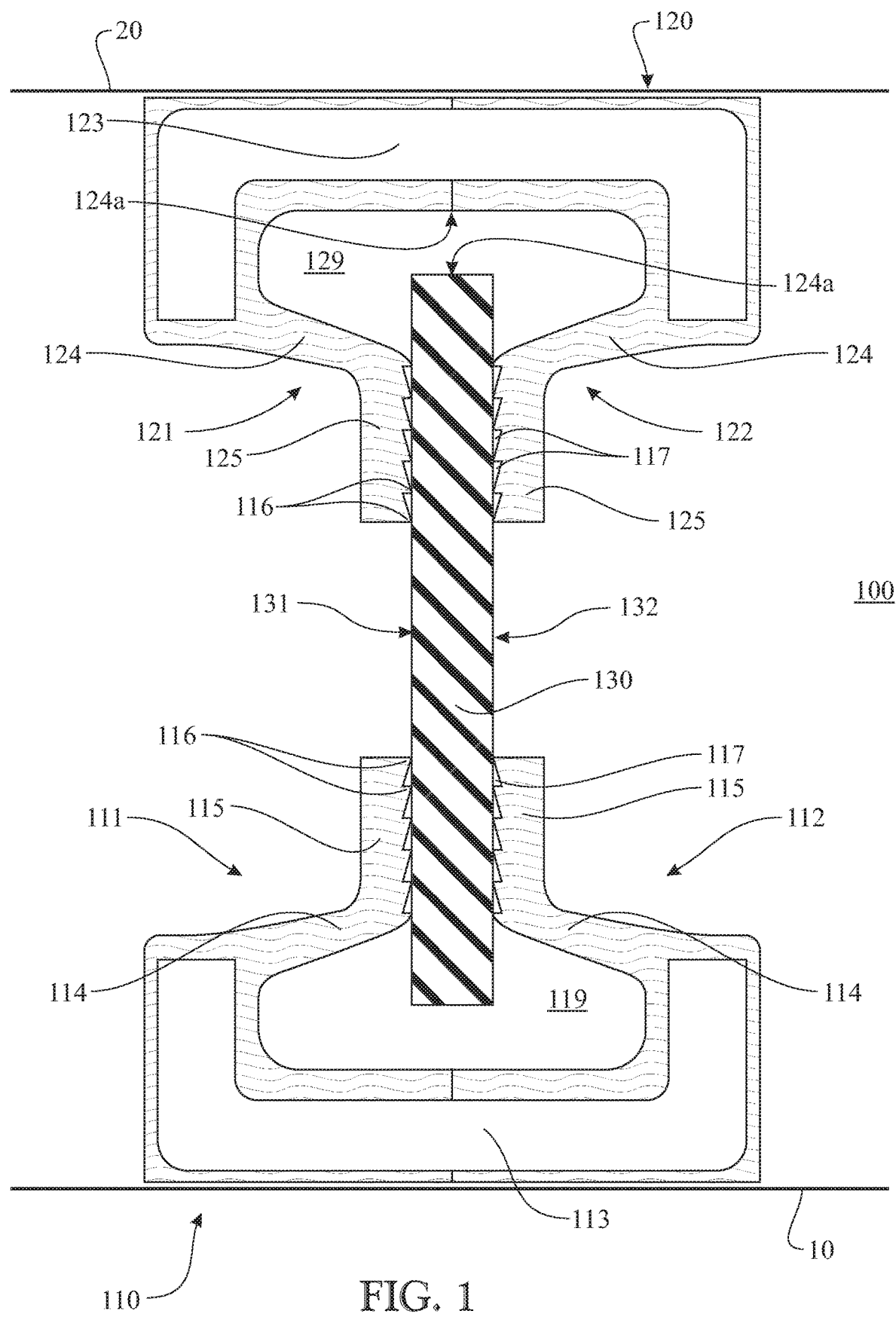
FIG. 1 shows a radial cross-section through a first example of a seal according to the invention.

An example of a radial seal according to the invention is depicted in FIG. 1.

The seal 100 comprises an inner seal part 110 and an outer seal part 120 which are respectively mounted to a shaft 10 and a housing 20 in the depicted example. The inner seal part 110 comprises first 111 and second 112 axially spaced, sealing elements which extend in a radially outward direction from an inner casing 113 that is mounted on the shaft 10. Likewise, the outer seal part 120 comprises first 121 and second 122 axially spaced sealing elements which extend in a radially inward direction from an outer casing 123 mounted to the housing 20. In this example, the sealing elements are made of an elastomeric material such as NBR.

The seal 100 further comprises an annular counterface part 130 that is arranged in a radial gap between the inner and outer seal parts 110, 120 and that is axially arranged between the first and second sealing elements 111, 112 of the inner seal part and between the first and second sealing elements 121, 122 of the outer seal part 120. The counterface part 130 may be an essentially flat ring made of a metallic or polymeric or ceramic material and has oppositely oriented first and second axial surfaces 131, 132 which serve as counterfaces of the seal 100.

In this example, the first and second sealing elements 111, 112 of the inner seal part 110 have an inner arm section 114 that extends in axial direction towards the counterface part 130. Likewise, the first and second sealing elements 121, 122 of the outer seal part 120 have an outer arm section 124 that extends in axial direction towards the counterface part 130. The inner and outer arm sections 114, 124 provide the respective sealing elements with stiffness. Further, the inner first and second sealing elements 111, 112 have an inner lip section 115 that extends in a radial direction and bears against the first and second axial surfaces 131, 132 of the counterface part 130 respectively. Likewise, the outer first and second sealing elements 121, 122 have an outer lip section 125 that extends in a radial direction and bears against the first and second axial surfaces 131, 132 of the counterface part 130 respectively.

Thus, a radially inner portion of the counterface part 130 is axially retained between the inner lip sections 115 and a radially outer portion of the counterface part is axially retained between the outer lip sections 125.

The counterface part 130 is axially retained by the inner and outer seal parts 110, 120, but is not fixed to either. Therefore, friction dictates whether the inner lip sections 115 or the outer lip sections 125 are in sliding contact with the first and second axial surfaces 131, 132 of the counterface part. Let us assume that the shaft 10 is the rotational component. If a first amount of friction between the outer lip sections 125 and the counterfaces 131, 132 is greater than a second amount of friction between the rotating inner lip sections 115 and the counterfaces, then the rotating inner lip sections 115 will be in sliding contact. However, if the first amount of friction increases due to e.g. breakdown of a lubricating film, and becomes higher than the second amount, then the counterface part 130 will rotate with the inner seal part 110, and the outer lip sections 125 will be in sliding contact with the counterfaces 131, 132.

Thus, the seal 100 automatically "selects" the sliding contact interface with the lowest friction, thereby minimising wear and extending seal life.

Preferably, the axial surface of the inner and outer lip sections 115, 125 that bears against the counterface part 130 has a number of micro-lips 116 formed by protrusions separated by recesses 117. Peripheral edges of the micro-lips 116 have a surface area that is significantly less than that of the aforementioned axial surface of the lip sections, meaning that low friction is generated during dynamic sealing conditions. In addition, the recesses 117 between the micro-lips 116 can serve as a reservoir for lubricant, to further reduce friction in the sliding contacts.

As may be seen from FIG. 1, the inner part 110 of the seal has a cavity 119 enclosed by the first and second sealing elements 111, 112 and a radially outer surface of the seal casing 113. Similarly, the outer part 120 of the seal has a cavity 129 enclosed by the outer first and second sealing elements 121, 122 and a radially inner surface of the outer casing 123. Advantageously, the cavities 119, 129 are provided with a grease for lubricating the sliding contacts between the lip sections 115, 125 of the seal and the first and second axial surfaces 131, 132 of the counterface part.

As may further be seen, the counterface part 130 extends into the cavity 119 of the inner seal part 110, with a radial gap to the radially outer surface of the inner casing 113, and extends into the cavity 129 of the outer seal part 120, with a radial gap to the radially inner surface of the outer casing 123. Thus, the counterface part 130 is suspended between the inner 115 and outer lip sections 125 of the inner and outer seal parts respectively. As a result, there is no radial load on the seal, which is therefore able to accommodate variations in the radial gap between the shaft 10 and housing 20, due to e.g. dynamic run-out, without causing uneven wear of the inner or outer seal lips.

In many radial seal applications, the seal must be able to withstand a pressure differential. Especially at high speeds, high pressure can build up within a bearing, which has an effect on the seal contact(s). In a further development of the invention, the seal is adapted to allow for an axial displacement of the counterface part, while maintaining effective sealing contact.

Figure 2:
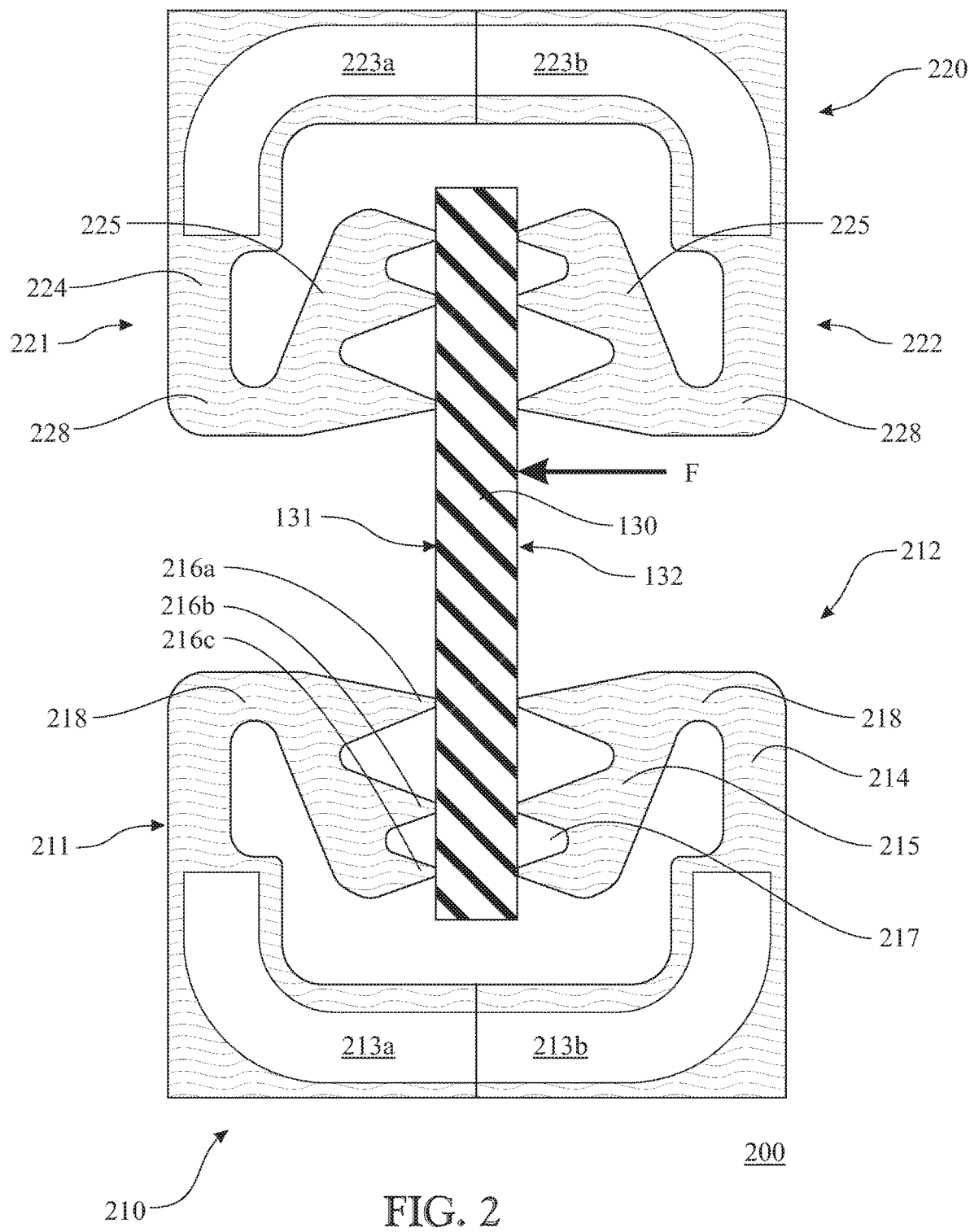
FIG. 2 shows a radial cross-section through a second example of a seal according to the invention.

An example of a seal according to the invention with this capability is depicted in FIG. 2.

Again, the seal comprises a counterface part 130 which is axially retained and radially suspended between first and second sealing elements 211, 212 of an inner seal part 210 and first and second sealing elements 221, 222 of an outer seal part 220. In this example, both of the inner and outer seal parts 210, 220 are formed from two separate pieces which are connected together. This facilitates assembly of the seal 200, given that the counterface part 130 radially overlaps both the inner and outer seal parts. The inner seal part has first and second casing elements 213a, 213b and the outer seal part 220 has first and second casing elements 223a, 223b, which are joined together in axial direction after the counterface part has been arranged between the sealing elements 211, 212, 221, 222.

Each sealing element is at least partly made from a resilient material such as rubber. The first and second sealing elements 211, 212 of the inner seal part 210 have an arm section 214 and a lip section 215. Each inner arm section 214 extends from the respective inner casing part 213a, 213b in a radially outward direction and comprises a bend or flexure 218. The lip section 215 extends from the flexure 218 in radially inward direction and in an axial direction towards the counterface part 230. In other words, the lip section 215 of the inner first and second sealing elements 211, 212 is angled relative to the first and second axial surfaces of the counterface part 130. Suitably, the lip sections 215 are angled so as to exert an axial force on the counterface part, due to the resiliency of each sealing element. Further, the lip section 215 comprises three micro-lips 216a, 216b, 216c in this example, with recesses 217 in between, whereby peripheral edges of the micro-lips are in contact with first and second axial surfaces 231, 232 of the counterface part 230.

The first and second sealing elements 221, 222 of the outer seal part 220 have a corresponding arm section 224, flexure 228 and lip section 225.

Let us assume that due to high pressure within the seal 200, an axial force F acts on the counterface part 230 in the direction indicated by the arrow. The seal is adapted to permit a small amount of axial displacement of the counterface part 230 relative to the inner and outer members. Depending on the application, the permitted axial displacement can be between 0.1 and 0.8 mm.

The counterface part 130 presses against the lip section 215, 225 of the first sealing elements 211, 221 of the inner and outer seal parts respectively. The flexure 218 in each first sealing element acts as a hinge point about which the respective lip section 215, 225 rotates, to enable the axial displacement of the counterface part 230. Further, the flexure 218 in the second sealing element 212, 222 of the inner and outer seal parts respectively acts as a hinge point about which the respective inner and outer lip sections 215, 225 rotate, due to the resiliency of the sealing elements 212, 222. As a result, the micro-lips 216a, 216b, 216c of the lip section 215, 225 of each second sealing element 212, 222 remain in contact with the second axial surface 232. In other words, the inner and outer lip sections 215, 225 remain parallel with the axial surfaces 131, 132 of the counterface part 130.

In addition, the stiffness of each lip section 215, 216 is adapted to permit axial displacement. The stiffness depends on the thickness of the lip section. Taking the lip section 215 of the first sealing element 211 of the inner seal part 210 as an example, the radially outermost micro-lip 216a has a greater axial width than the intermediate micro-lip 216b, which in turn has a greater axial width than the innermost micro-lip 216c. Thus, the main body of the lip section 215 has an essentially constant thickness, and a corresponding stiffness which permits axial displacement.

Figure 3:
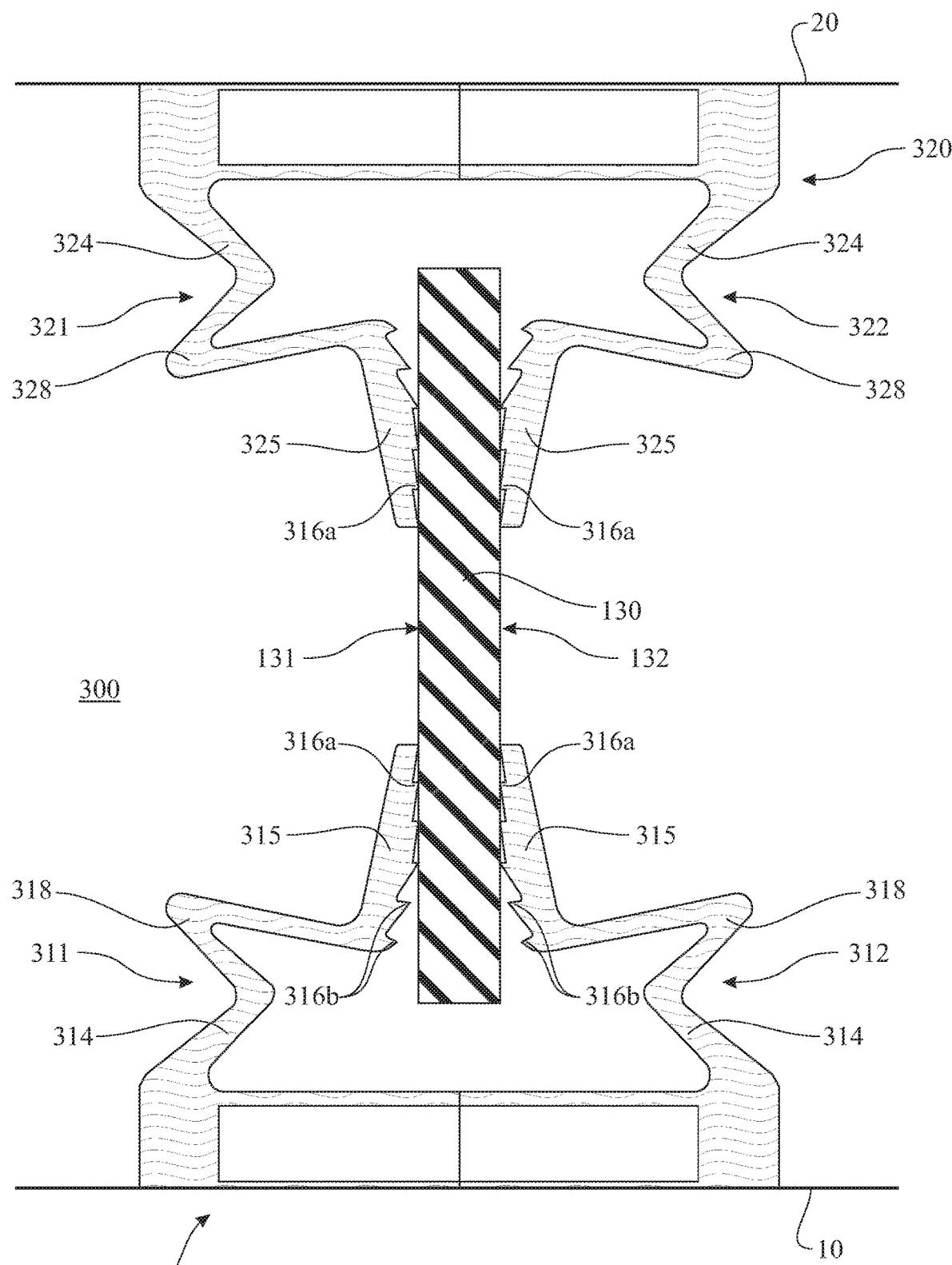
FIG. 3 shows a radial cross-section through a third example of a seal according to the invention.

An advantage of a such a seal according to the invention is that pressure compensation is possible. A further example of a radial seal that permits pressure compensation within e.g. a sealed bearing is depicted in FIG. 3.

Again, the seal comprises a counterface part 130 which is axially retained and radially suspended between first and second sealing elements 311, 312 of an inner seal part 310 and first and second sealing elements 321, 322 of an outer seal part 320. Each sealing element is at least partly made from a resilient material such as rubber. The first and second sealing elements 311, 312 of the inner seal part 310 have a flexible arm section 314 and a lip section 315 that bears against first and second axial counterfaces 131, 132 of the counterface part. The flexible arm section 314 has a V-shaped flexure 318, which acts as a spring to urge the lip section 315 against the respective counterface. The first and second sealing elements 321, 322 of the inner seal part 320 also have a flexible arm section 324 and a lip section 325 that bears against the first and second axial counterfaces 131, 132. Again, the flexible arm sections 324 have a V-shaped flexure 318, which acts as a spring to urge the outer lip sections 325 against the respective counterface. As explained above, the flexure 318 in each sealing element 311, 312, 321, 322 also acts as a hinge point, to enable the lip sections 315, 325 to remain parallel to the counterface part when an axial displacement of the counterface part 130 occurs Further, each lip section 315, 325 comprises a number of first micro-lips 316a (four in the depicted example) which are in contact with the respective counterfaces 331, 332, when the counterface part 230 is in an undeflected position. Each lip section 315, 325 also has a number of second micro-lips 316b (two in the depicted example) with an axial gap to the counterface part 330. The width of the gap is less than or equal to the maximum axial displacement for which the seal is designed. The lip sections are designed such that when a pressure acting on the counterface part 130 causes it to move in the direction of e.g. the first sealing elements 311, 321 of the inner and outer seal parts, the corresponding lip sections 315, 325 bend, so that the second micro-lips 316b also come into contact with the counterface part 130. The sealing effect is thus enhanced at that axial side of the seal, given that six micro-lips are now in contact with the counterface part.

Figure 4:
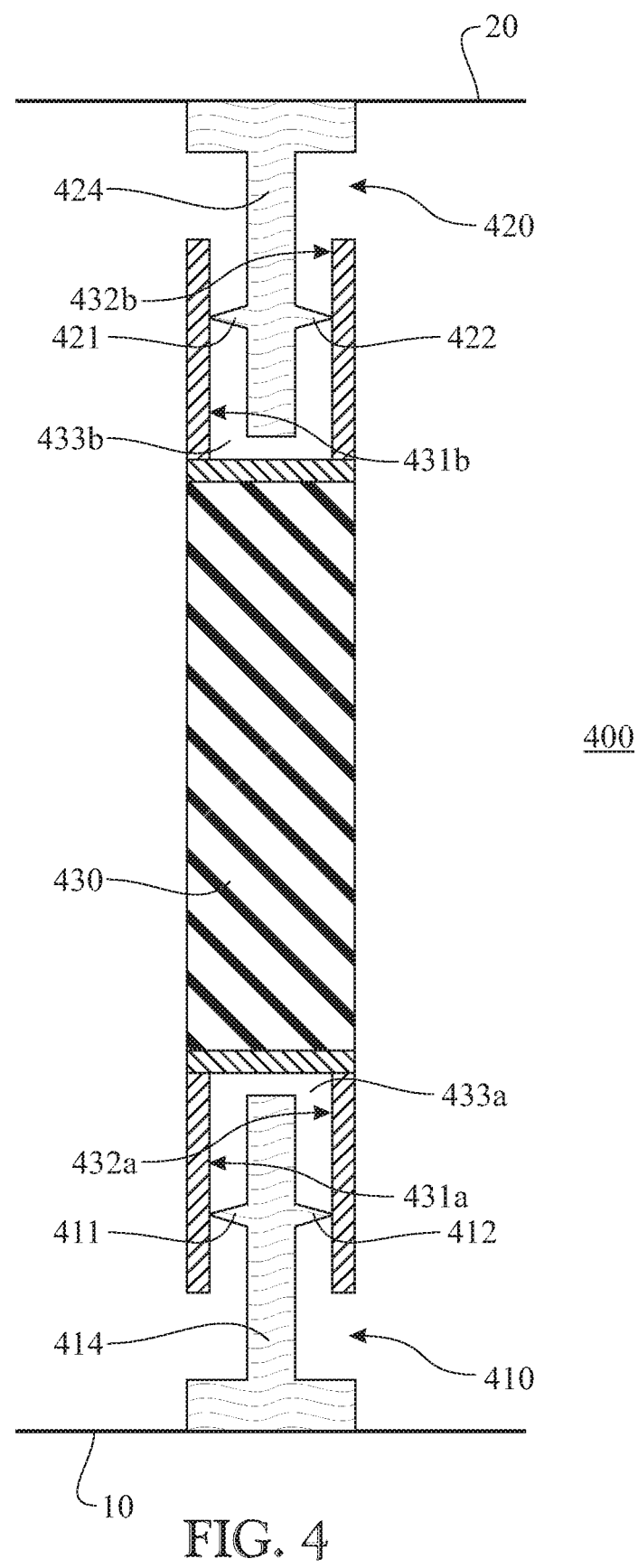
FIG. 4 shows a radial cross-section through a fourth example of a seal according to the invention.

In the embodiments of a seal according to the invention depicted thus far, the counterface part has axially outer surfaces that are retained between the first and second sealing elements of the inner and outer seal parts. An alternative embodiment is depicted in FIG. 4, in which the counterface part is retained at axially inner surfaces thereof, which enclose the first and second sealing elements.

Again, the seal 400 has an inner seal part 410 mounted to a shaft 10 and an outer seal part 420 mounted to a housing 20. The counterface part 430 is radially suspended between the inner and outer seal parts and in this example has a first U-shaped annular cavity 433a at its inner circumference and has a second U-shaped annular cavity 433b at its outer circumference. The inner seal part 410 has a radially extending flange 414 that extends into the first cavity 433a, with a radial gap to the circumferential surface of the first cavity. Likewise, the outer seal part 420 has a radially extending flange 424 that extends into the second cavity 433b, with a radial gap to the circumferential surface of the second cavity. Further, the flange 414 of the inner seal part has first and second seal lips 411, 412 that respectively bear against first and second inner axial surfaces 431a, 432a of the first cavity 433a. Likewise, the flange 424 of the outer seal part has first and second seal lips 421, 422 that respectively bear against first and second inner axial surfaces 431b, 432b of the second cavity 433b. As before, the counterface part 430 is free of radial load and the seal 400 can accommodate dynamic run-out without increased friction and wear.

In this embodiment, the counterface part 420 is suitably formed from two separate sections which are joined together axially after the inner and outer seal parts 410, 420 have been arranged against one of the separate sections.

A number of aspects/embodiments of the invention have been described. It is to be understood that each aspect/embodiment may be combined with any other aspect/embodiment. The invention may thus be varied within the scope of the accompanying patent claims.

The invention claimed is:

1. A dynamic seal for enclosing a radial gap between coaxial, relatively rotatable inner and outer members, comprising:
an inner seal part, mountable to the inner member;
an outer seal part, mountable to the outer member; and
an annular counterface part having a radially inner end and a radially outer end, the annular counterface part being radially suspended between the inner and outer seal parts in a floating manner, and coaxial therewith,
wherein:
the inner seal part comprises a set of inner seal axially spaced sealing elements comprising a first axially spaced sealing element and a second axially spaced sealing element, the first axially spaced sealing element and the second axially spaced sealing element of the inner seal part are supported by an inner casing, the inner casing having a radially outer surface, wherein the first axially spaced sealing element and the second axially spaced sealing element of the inner seal part bear against oppositely oriented axial surfaces of the annular counterface part, to axially retain the counterface part at a radially inner location, a radially inner end of the annular counterface part and the radially outer surface having a gap therebetween; and
the outer seal part comprises a set of outer seal axially spaced sealing elements comprising a first axially spaced sealing element and a second axially spaced sealing element, the first axially spaced sealing element and the second axially spaced sealing element of the outer seal part are supported by an outer casing, the outer casing having a radially inner surface, wherein the first axially spaced sealing element and the second axially spaced sealing element of the outer seal part bear against oppositely oriented axial surfaces of the annular counterface part, to axially retain the annular counterface part at a radially outer location, a radially outer end of the annular counterface part and the radially inner surface having a gap therebetween,
wherein the gap between the radially inner end of the annular counterface part and the radially outer surface and the gap between the radially outer end of the annular counterface part and the radially inner surface enables radial movement of the annular counterface part in a radially direction during use.

2. The dynamic seal according to claim 1, wherein the first sealing element and the second sealing element of the inner seal part bear against axially outer surfaces of the annular counterface part, and wherein an inner circumference of the annular counterface part extends into a cavity enclosed by the inner set of sealing elements and the interior surface of the inner casing.

3. The dynamic seal according to claim 2, wherein the inner seal part is formed from two separate pieces which are axially joined together by the inner casing.

4. The dynamic seal according to claim 1, wherein the first and second sealing elements of the outer seal part bear against axially outer surfaces of the annular counterface part and wherein an outer circumference of the annular counterface part extends into a cavity enclosed by the outer set of sealing elements and the interior surface of the outer casing.

5. The dynamic seal according to claim 4, wherein the outer seal part is formed from two separate pieces, which are axially joined together by the outer casing.

6. The dynamic seal according to claim 2, wherein the first sealing element and the second sealing element of the outer seal part bear against axially outer surfaces of the annular counterface part and wherein an outer circumference of the annular counterface part extends into a cavity enclosed by the outer set of sealing elements, and wherein a lubricant is provided in at least one of the cavities.

7. The dynamic seal according to claim 2, wherein the first sealing element and the second sealing element of the outer seal part bear against axially outer surfaces of the annular counterface part and wherein an outer circumference of the annular counterface part extends into a cavity enclosed by the outer set of sealing elements,
wherein each sealing element of the inner and outer seal parts comprises an arm section and a lip section that bears against the annular counterface part.

8. The dynamic seal according to claim 7, wherein the seal is adapted to permit an axial deflection of the annular counterface part relative to the inner member and the outer member, and wherein each arm section comprises a flexure that urges the corresponding lip section against the annular counterface part and serves as a hinge point about which each arm section can rotate in response to the axial deflection.

9. The dynamic seal according to claim 7, wherein at least one lip section comprises a plurality of micro-lips formed by protrusions that extend from an axial surface of the lip section.

10. The dynamic seal according to claim 8, wherein at least one lip section comprises a first micro-lip that is in contact with the annular counterface part and further comprises a second micro-lip that presents an axial gap to the annular counterface part, when the annular counterface part is in a non-deflected axial position, and the axial gap is less than or equal to an axial deflection of the annular counterface part that the seal is designed to permit.

11. The dynamic seal according to claim 8, wherein at least one lip section is angled relative to the annular counterface part and comprises two or more micro-lips of different axial length.

12. The dynamic seal according to claim 1, wherein the seal has axial and radial symmetry.

* * * * *